May 25, 1971     I. R. HIGGINS     3,580,842
DOWNFLOW ION EXCHANGE
Filed April 8, 1968
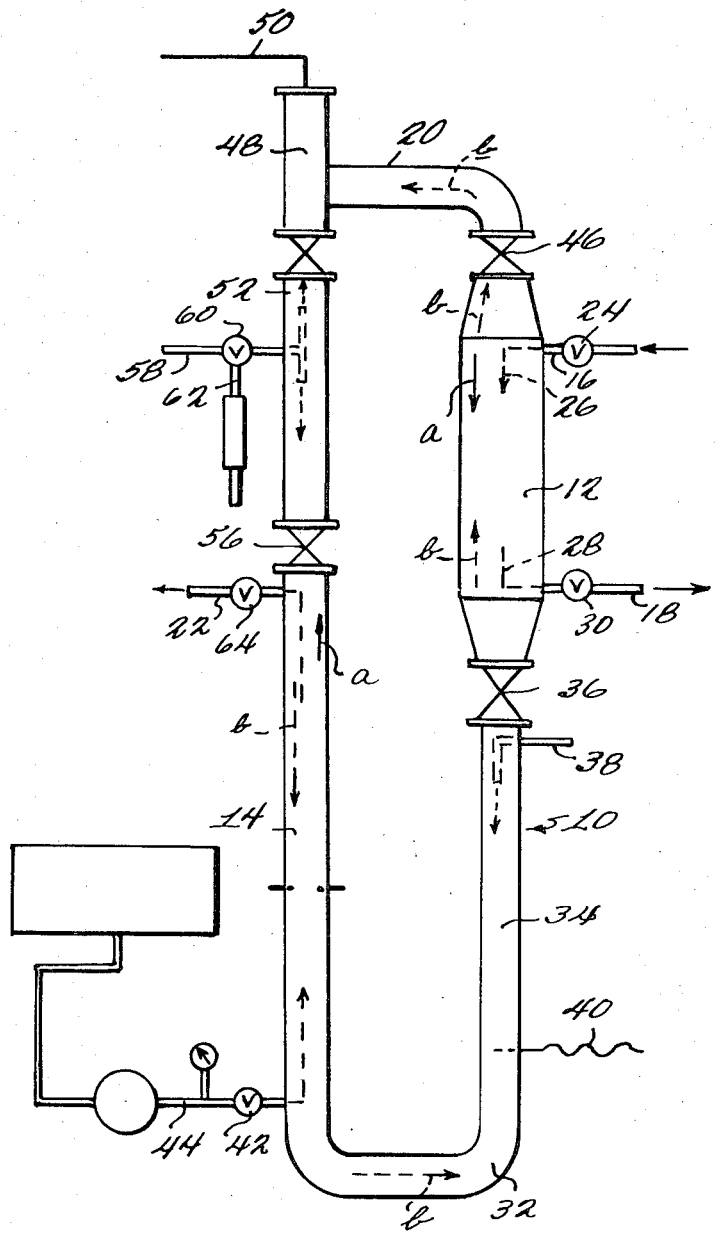
INVENTOR
IRWIN R. HIGGINS
BY Cushman, Darby & Cushman
ATTORNEYS United States Patent Office 3,580,842
Patented May 25, 1971

3,580,842
DOWNFLOW ION EXCHANGE
Irwin R. Higgins, Oak Ridge, Tenn., assignor to Chemical Separation Corporation, Oak Ridge, Tenn.
Filed Apr. 8, 1968, Ser. No. 719,389
Int. Cl. B01d 15/02, 15/06; C02b 1/16
U.S. Cl. 210—25                     11 Claims

ABSTRACT OF THE DISCLOSURE

A continuous cyclic process for countercurrent contact of a contaminant containing liquid with a solid in a column loop which includes introducing the contaminant containing liquid into the upper portion of one section of the column loop for downward flow through the solids bed therein to transfer or load the contaminant onto the solids. The section is positioned adjacent the upper end of the column loop. Liquid with a reduced amount of contaminant is withdrawn from the lower portion of this section. A regenerating agent is fed to the lower portion of another section of the column loop for flow through a bed of solids loaded with the contaminant. The flow of liquid and regenerating agent are interrupted and the solids bed is shifted around the loop and the loading and regenerating cycles are then repeated.

---

This invention relates to a novel method for effecting substantially continuous countercurrent contact between liquid and solid materials and more particularly to a method wherein a downwardly directed contaminant-containing liquid countercurrently contacts a solid material to remove the contaminants from the liquid.

The present invention is advantageously employed in the treatment of such liquids as water to soften and demineralize or deionize the same, to reduce the alkalinity of water, to remove color, odor and organic materials from the liquid, to remove pollution contaminants such as plating wastes from the liquid or any other similar treatment wherein the removal of a contaminant in a liquid is desired and the liquid is contacted with a solid material to achieve the desired objective. Where the liquid is water and it is desired to soften or demineralize the same, the solid can be an ion exchange material such as a strong acid cation exchange resin, a weak acid cation exchange resin, a strong base anion exchange resin or a weak base anion exchange resin. Systems involving a combination of one or more of these ion exchange resins can also be utilized. Such ion exchange resins are commercially available and are sold under such trade names as Amberlite, Dowex, etc. Again, where the liquid is water and it is desired to remove contaminants imparting an undesirable color or odor to the water or to remove certain undesirable organic materials therefrom, the solid material can be, for instance, activated carbon or the like. It has also been found that when the liquid contains phosphates, the removal of which is desirable, the liquid can be contacted with alumina. Accordingly, it will be recognized that depending on the particular choice of solid material used as well as the nature of the contaminant to be removed from the liquid, the regenerant used in this invention can be, for instance, one such as a brine or other salts, an acid, a base, an alcohol or the like or the regeneration can be effected by the use of heat or electrolytic cells as well as other known solids regenerating techniques. It will thus be appreciated that the present invention has wide applicability and while the following discussion is concerned with a specific mode of practicing the invention, i.e. the treatment of raw water to soften the same, the discussion is not intended to limit the same.

Water softening is recognized as an important and essential operation in a wide variety of industrial operations. Even most municipal systems desire a hardness content of their treated water not exceeding 85 p.p.m. while in some instances, both municipal and industrial, a hardness content not greater than 0–25 p.p.m. is required. While, for instance, ion exchange techniques have played an important role in attempting to attain these goals, in the removal of harmful or undesirable cations and/or anions from natural water supplies, and while ion exchange techniques are extremely beneficial especially where the initial hardness content of the water to be treated is in the order of 200 p.p.m. hardness or greater, certain disadvantages have been experienced in known ion exchange techniques.

For instance, one type of a conventional water softener includes a fixed-bed, single-stage system for both water demineralization and ion exchange regeneration. Such a system is generally considered inefficient in that it is operated at relatively low flow rates, i.e about 10 g.p.m./ft.$^2$ and requires excessive amounts of regenerant.

In contrast to known fixed-bed systems, continuous countercurrent ion exchange systems have been employed which have been considered quite beneficial since they eliminate many of the disadvantages associated with fixed-bed systems. Thus continuous countercurrent ion exchange systems handle flow rates many times larger than those realized through fixed-bed systems and at the same time make it possible to regenerate hardness loaded resins substantially stoichiometrically. Additionally, significant savings are realized through reduced regenerant usage, reduced resin inventory and smaller initial capital costs.

In a typical conventional countercurrent ion exchange process use is made of apparatus shown, for instance, in U.S. Pat. 2,815,322 which includes a tower for supporting a column of exchange resin having an inlet intermediate the ends thereof for introducing a feed water to be softened. There is also provided above the feed water inlet an inlet for introducing a regenerant. Intermediate the feed water inlet and the regenerant inlet there is an outlet for withdrawing a solution of the minerals previously removed from the feed water by loading onto an ion exchange resin. The solution of the minerals is produced in the stripping section by contact of the loaded resin with the regenerant.

Below the feed water inlet there is also provided an outlet for the softened water. This outlet is adjacent the bottom of the loading section which is subjacent the stripping section, and is, generally, adjacent the bottom portion of the tower. The top of the stripping section is connected to the bottom of the loading section, i.e. the bottom of the tower through a loop connection which provides a return path for the regenerated resin to the bottom of the loading section.

The regenerated resin entering the bottom of the loading section is moved upwardly for contact with the down flowing feed water during which contact the hardness values of the feed water are loaded onto the ion exchange material. The loaded resin is continued to be moved upwardly into the stripping section for regeneration by the down flowing regenerant and the cycle is continuously repeated.

It has been found, however, that certain disadvantages are experienced in such an ion exchange process. Thus the regenerant, introduced near the top of the tower for downward flow through the upwardly moving loaded resin promoted channelling effects which interfered with the desired level of regeneration of the ion exchange material.

In yet another known ion exchange system the loading section is again located adjacent the bottom of one leg of the loop and is provided with a feed water inlet also near the bottom thereof for upward flow of feed water through the loading section and countercurrent contact with a downwardly moving ion exchange material. An outlet near the top of the loading section is provided for removal of softened water. The bottom of the loading section is connected to the other leg of the loop wherein the resin loaded with the hardness values of the original feed water is moved upwardly for countercurrent contact with a descending flow of regenerant or stripping solution. From the top of the stripping section the regenerated ion exchange material is moved into an overflow section atop the loading section in the other leg of the loop where, periodically, it is permitted to be introduced into the loading section for countercurrent contact with the upflowing feed water therein. Again the cycle is repeated to give a continuous process for softening water.

Such a system also has exhibited several disadvantages. For instance, it has been found that the rate of introduction of the feed water into the loading section requires a minimum value to prevent collapse of the downwardly directed bed of ion exchange material. Such a collapse or the formation of a pocket at the upper level of the bed in the loading section would significantly minimize loading efficiency. It has also been found that during the resin movement stage, i.e. during the pulsing stage, the downwardly directed resin forms a pocket at the top of the loading section which has to be filled when the feed water is again introduced into the system. Otherwise the inflowing, upflowing raw water bubbles through the resin without maximum or desirable hardness value removal therein, thereby increasing the hardness value of the product water. Additionally, during the resin movement stage the downwardly directed resin contributes significantly to the jamming of the resin valve which is positioned below the raw feed water inlet and which connects the loading section to the stripping or regenerating section. This jamming effect leads to undesirable increased resin attrition values.

Further, in the stripping or regenerating section, which constitutes the other leg of the column loop, the regenerant is introduced at a point intermediate the ends thereof, thus establishing a downward flow of a relatively heavy liquid for countercurrent contact with the upwardly directed loaded resin. This arrangement may unfavorably tend to create or promote channelling through the resin bed in this regenerating section. Moreover, the backwash and pulse waters as well as the regenerated resin rinse water required in this known system had to be a high quality water, for instance, product water, where the specifications called for a product water having an extremely low hardness value.

It is therefore a principal object of the present invention to provide a method for contacting solids with a liquid which overcomes the disadvantages of prior art methods.

Another object of the instant invention is to provide a novel apparatus and method which increase the efficiency of treating a liquid to remove undesirable contaminants therefrom.

A further object of the instant invention is to provide a novel apparatus and method for removing contaminants from a liquid feed stream which substantially eliminates the requirement of a minimum of feed liquid flow rate and which also substantially reduces the tendency of feed liquid channelling through the solids bed in the loading section of the apparatus.

A still further object of the present invention is to provide a novel method and apparatus for reducing the hardness value of a raw water feed stream.

Other objects and advantages will be apparent from the following description taken in connection with the accompanying drawing which is a flow sheet schematically illustrating the ion exchange column loop of this invention for softening a raw feed water stream.

General description of apparatus and method

The apparatus shown diagrammatically in the drawing comprises a continuous ion exchange column loop system 10 having two operating ion exchange sections, i.e., a loading section 12 and a stripping section 14. The direction of liquid flow is indicated by the solid arrows $a$ and the direction or resin flow is indicated by the open arrows $b$. The loading section 12 is positioned adjacent the upper portion of one of the legs of the column loop and a raw feed water to be softened enters through conduit 16 adjacent the upper portion of the loading section 12. This loading section contains a strong acid type cation exchange resin in the acid or salt form, and as the raw feed water flows downwardly therethrough the sodium ions or the hydrogen ions of the ion exchange resin are exchanged into solution and the metal ions such as magnesium and calcium are adsorbed on the resin. Thus a softened product water is withdrawn from the lower portion or region of the loading section 12 through conduit 18.

It will, of course, as indicated above, be recognized that rather than removing calcium and magnesium ions which comprise essentially the hardness values of a feed water, the present invention is also applicable in the removal of undesirable anions as well as other cations.

Thus the metal or other ion rich resin now in the loading section 12 is shifted upwardly around the upper loop end 12 and is passed downwardly to the stripping section 14. In stripping section 14 a regenerating agent such as a regenerating salt solution is passed upwardly through the bed of loaded resin, and the metal ions loaded thereon such as magnesium and calcium ions are exchanged into solution with adsorption of sodium ions from the regenerating solution. Thus, the waste solution removed from the stripping section 14 via conduit 22 is a metal salt of the regenerating solution.

In order to practice the overall process, certain conditions must exist and be controlled. It is important to control the aqueous composition in various zones of the loop so that the water feed is confined essentially to the loading section and the regenerating solution is confined essentially to the stripping section. Means are also provided to shift the resin bed no more and no less than a certain amount in order that proper and efficient exchange will take place.

Detailed description of apparatus and method

Raw feed water enters ion exchange column 10 through valve 24 via conduit 16 and distributing means 26. The distributing means 26 is located at the upper end of the loading section 12 which, in turn, is located adjacent the top or upper portion of the ion exchange column 10. The raw feed water flows downwardly through the cation exchange resin bed contained in loading section 12 and on which is absorbed the hardness metal values thereof. Softened water passes out of this section through collecting means 28 and pipe 18 provided with valve 30.

The continuous ion exchange column 10 includes the loading section 12 which is arranged to permit upward flow of resin therein and stripping section 14 arranged for downward flow of resin therein. The lower loop section 32 extends from the stripped resin discharge end of the stripping section 14 up to the resin rinse section 34 which, in turn, communicates with the resin inlet end of the loading section 12. Resin rinse section 34 is provided with resin valve 36 which controls the delivery of freshly stripped and rinsed resin into the loading section 12. Immediately subjacent the resin valve 36 in resin rinse section 34 is resin rinse water inlet 38 which can lead from a source of rinse water such as a by-pass stream from the product water line 18, if desired. Resin rinse section is also provided at a point remote from the rinse water inlet 38 with a conductivity probe 40 which is responsive to changes in the conductivity of the solution in the ion exchange column 10 at its location. The conductivity probe 40 can be arranged with an appropriate servomechanism, such as a solenoid valve (not shown) to actuate valve 38 in the resin rinse line 38 should the regenerating agent/water interface which forms a definite boundary rise above the conductivity probe 40.

The upper end of the loading section 12, i.e. the loaded resin outlet end thereof, is connected to one end of the upper loop end 20 via resin valve 46. The other end of the upper loop end 20 is connected to reservoir 48 which is provided at one end thereof with overflow means 50 for backwash and pulse waters as well as resin fines which means can lead to a disposal unit or resin fines recovery system (not shown).

The other end of reservoir 48 is connected to the upper zone of pulse section 52 through resin valve 54. The lower zone of pulse section 52 is connected to the loaded resin inlet end of stripping section 14 via resin valve 56. Intermediate the upper and lower zones of pulse section 52 and preferably near the top of the section 52 is pulse water inlet conduit 58 controlled by two-way valve 60 which also controls delivery of backwash water to the pulse section 52 via conduit 62.

Adjacent the upper end of stripping section 14, i.e. the loaded resin inlet end is conduit 22 controlled by valve 64 which permits removal of hardness metal salt solution from the column 10. Remotely positioned from conduit 22 in stripping section 14 and preferably immediately above the stripped resin outlet end thereof is regenerating agent inlet conduit 44 controlled by valve 46 which regenerating agent flows upwardly through the loaded resin confined in stripping section 14.

In operation of the ion exchange column 10 during the loading and stripping cycle when resin regenerating agent is flowing upwardly through the stripping section 14 and a separate portion of the ion exchange resin is being loaded with hardness metal ions, such as calcium and magnesium ions or even iron ions, from the raw feed water in loading section 12, resin valves 36, 46 and 56 are closed and resin valve 54 is open. Valves 42 and 64 in lines 44 and 56, respectively, are opened, permitting regenerating agent flow upwardly through the hardness metal ion loaded bed in stripping section 14 and removal of waste hardness metal salt solution from the column loop 10. Valve 24 in line 16 is opened to permit introduction of raw feed water into the loading section 12 for downward flow through the fresh resin therein while valve 30 in line 18 is opened for removal of softened product water from the column loop.

After a predetermined time of passage of resin regenerating agent through the stripping section 14, the column 10 is operated so as to shift and replace the ion exchange resin bed contained therein by introducing a fresh portion of hardness metal ion loaded resin. Valves 36, 46 and 56 are automatically opened and a valve 54 is closed. A hydraulic pulse is applied to the pulsing chamber 52 by introducing pulse water thereto via line 58 with valve 60 in the open position. The pulse water fluidizes the resin which moves around the loop. Thus fresh resin is inserted into the bottom of loading section 12 via open valve 36 while at the same time a corresponding volume of resin is withdrawn from the top of the loading section 12 and enters the resin reservoir 48. Simultaneously, resin in the pulse section is released through open valve 56 and enters the top portion of resin regenerating section 14. Also simultaneously, freshly stripped resin adjacent the bottom portion of resin regenerating section 14 is released and enters the resin rinse section 34. The regenerated and rinsed resin displaced from the rinse section is that resin which moves into the bottom of the loading section 12 through valve 36.

At the end of the pulse cycle, valve 54 is opened and deposits a supply of hardness metal ion loaded resin into the pulse section 52 and valves 24, 30, 42, 64 and 38 are again opened to repeat the softening-regeneration cycle.

As stated above valve 38 is controlled by the conductivity probe or monitor 40 to provide a water to regenerating agent interface thus assuring that only fresh, regenerated, substantially regenerating agent-free resin is pulsed into the lower portion of the loading zone 12 during the next pulsing cycle.

The above described arrangement of the various sections of the column loop and the method of processing the various liquids introduced therein result in the above described advantages not heretofore achieved in conventional continuous countercurrent ion exchange equipment and methods. It can thus be appreciated that the upward flow of freshly regenerated and rinsed resin into the lower portion of loading section 12 through valve 36 eliminates jamming of the valve and thus significantly reduces resin losses through attrition of the same. Equally important is the fact that in the regeneration section, the upward flow of the relatively heavy regenerating agent substantially minimizes unfavorable channeling effects which otherwise are experienced when the regenerant is caused to flow in a downward direction in this section. The present arrangement thus enhances significantly the efficiency of the stripping cycle and the overall efficiency of the column operation to soften water. Further because the pulse section is arranged to deliver initially a new supply of hardness metal ion loaded resin into the upper portion of the regeneration section as opposed to the pulsing of freshly regenerated resin into a loading section as in known procedures, the pulse water and backwash water need not be a high quality water even when a high quality product water is desired.

Discussion of specific embodiments of the invention

As a specific embodiment of the invention and with reference to the drawing, this system can be conveniently operated by processing in the continuous ion exchange column loop 10, which is filled with a sodium form cation exchange such as is sold under the trade name of Dowex, HCR, HGR, or HCR-W, 0.06–3 to 4 million gallons per day or higher of raw feed water which is introduced into the loading section through conduit 16 at a rate of 40–3000 gallons per minute. The resin can have a size ranging from 16 to 100 mesh and preferably between 16 to 30 mesh. Resins other than those in the sodium form can also be employed such as acid cation resins including a sulfonated polystyrene cation exchange resin sold under the trade name of Dowex 50W x 8, 20–50, as well as other commercially available resins sold under the trade names of Amberlite, Permutit Q, etc. The raw feed water flows downwardly through the loading zone which is 6 feet in diameter and 4 feet high while the stripping section is 3 feet in diameter and 10 feet high.

The diameter of the loading zone as well as the diameter of the stripping section can be varied. Generally the diameter of the loading zone will be at least about 12 inches in order to achieve an economical as well as efficient treatment of the liquid.

The softening and stripping cycle generally lasts about 2 to 15 minutes. To treat the raw feed water approximately 250 cu. ft. of resin are employed to give a production rate of about 10 to 75 g.p.m. per sq. ft. of resin bed area. The resin is shifted in the column at a rate of about 0.3 to 2.0 cu. ft. per minute during a pulse cycle which lasts about 5 to 10 seconds or even up to 20 seconds, based on a 400 p.p.m. water reduced to less than 25 p.p.m.

Pulse water which conveniently and advantageously can be raw water is introduced into pulse section 52 of the column at a rate up to 500 gallons per minute while the flow rate of resin rinse water into resin rinse section 34 ranges between about 2 to 15 gallons per minute.

In reducing the hardness level of a raw feed water having an initial hardness value of 400 p.p.m. to less than 25 p.p.m., 4 pounds of NaCl as the regenerating agent were employed per 1000 gallons of water. The amount of regenerating agent employed will, of course, be dependent on a number of easily ascertainable factors such as the initial hardness of the raw water fed to the column, the level of hardness removal desired, and the flow rate.

The column, preferably, is constructed of mild steel and the sections of the column can be belled to 12-inch diameter butterfly valves and 12-inch elbows.

It will be understood from the foregoing description that this invention is not limited to practice according to the specific embodiments illustrated and described herein, and that variations thereof can be made while not departing from the principles involved. This invention is, therefore, to be understood to be limited only by the spirit and scope of the following claims.

What is claimed is:

1. A continuous cyclic process for contacting a liquid with a solids, said liquid containing a contaminant to be removed therefrom which comprises:
   (1) introducing a liquid containing a contaminant into the upper portion of a first section of a column loop having a shiftable solids bed therein and causing said liquid to flow downwardly through said solids bed to transfer the contaminant from the liquid to the solids, said first section of the column loop being positioned adjacent the upper end of said column loop; while
   (2) withdrawing from the lower portion of said first section the resulting liquid with substantially reduced amounts of said contaminant;
   (3) introducing a regenerating agent into the lower portion of a second section of said column loop containing said solids loaded with contaminants from (1) and causing said regenerating agent to flow upwardly through said contaminant loaded solids;
   (4) withdrawing from the upper portion of said second section a regenerating agent containing said contaminant;
   (5) interrupting the flow of liquid containing a contaminant in (1) and the flow of regenerating agent in (3) to the respective first and second sections of said column loop;
   (6) introducing solids pulse medium into a solids pulse section intermediate the inlet and outlet thereof, the outlet of said solids pulse section communicating with the upper portion of said second section of said column loop and the inlet of said solids pulse section communicating with the upper portion of said first section whereby the solids bed in said column loop is shifted from one section thereof to another contiguous section therein, thereby introducing into the upper portion of the second section solids from said solids pulse section which carry the contaminant previously eliminated from the liquid for regeneration thereof, whereby in turn at least a part of said solids in the lower portion of said second section is displaced therefrom, thereby causing the introduction into the lower portion of the first section solids which have previously been regenerated in said second section, whereby, in turn, at least a part of said solids in the upper portion of said first section is displaced therefrom;
   (7) detecting the presence of regenerating agent in the solids bed being pulsed between the lower portion of said second section and the lower portion of said first section and in response thereto introducing solids rinse medium into said column loop intermediate said first and second section in a direction countercurrent to the movement of said solids bed, thereby establishing the introduction of substantially regenerating agent-free solids into the lower portion of said first section.

2. The process of claim 1 wherein the regenerating agent is selected from the group consisting of an acid, a base and a water soluble salt.

3. The process of claim 1 wherein the liquid is raw water.

4. The process of claim 3 wherein the raw water is introduced into the upper portion of said first section of the column loop in (1) at a rate of about 40–3000 g.p.m. and the resin bed is such that 10–75 g.p.m. of water per sq. ft. of bed is treated.

5. The process of claim 4 wherein the solids are ion exchange resin particles.

6. The process of claim 5 wherein the ion exchange resin particles comprise a cation exchange resin.

7. The process of claim 5 wherein the ion exchange resin particles comprise an anion exchange resin.

8. The process of claim 5 wherein the resin particles have a mesh size ranging from 16–100 mesh.

9. The process of claim 8 wherein the resin particles have a mesh size ranging from 16–30 mesh.

10. The process of claim 5 wherein the introduction of liquid downwardly through the solids bed in the column loop in step (1) and the introduction of regenerating agent in step (3) are both conducted during a first predetermined period of time and said shifting of said solids bed in step (6) is carried out for a second predetermined period of time.

11. A continuous cyclic process for contacting a liquid with solids, said liquid containing a contaminant to be removed therefrom which comprises
   (1) introducing a liquid containing a contaminant into the upper portion of a first section of an ion exchange vessel having a shiftable ion exchange resin bed therein and causing said liquid to flow downwardly through said ion exchange resin bed to transfer the contaminant from the liquid to the ion exchange resin;
   (2) withdrawing from the lower portion of said first section the resulting liquid with substantially reduced amounts of said contaminant;
   (3) introducing a regenerating agent into a second section of said ion exchange vessel containing ion exchange resin loaded with contaminants from (1) and causing said regenerating agent to contact said contaminant loaded ion exchange resin therein;
   (4) withdrawing from said second section a regenerating agent containing said contaminant;
   (5) transferring a portion of ion exchange resin regenerated in said second section and introducing the same into the lower portion of said first section for contact with liquid containing a contaminant, thereby displacing a portion of the ion exchange resin loaded with contaminant from the upper portion of said first section;
   (6) transferring said resin loaded with contaminant and displaced from the upper portion of said first section to another section of said ion exchange vessel communicating therewith, thereby displacing another portion of the ion exchange resin loaded with contaminant from said another section;
   (7) transferring said another portion of said ion exchange resin loaded with contaminant and displaced from said another section to said second section for regeneration therein; and
   (8) detecting the presence of regenerating agent in the ion exchange resin bed being transferred between the said second section and said first section and in response thereto introducing resin rinse medium into said ion exchange vessel intermediate said first and second section in a direction countercurrent to the transfer of said resin thereby establishing the introduction of substantially regenerating agent-free ion exchange resin into said first section.

References Cited

UNITED STATES PATENTS 2,528,099  10/1950  Wilcox et al. _____ 210—33

(Other references on following page)

References Cited

| | | |
|---|---|---|
| 2,671,714 | 3/1954 | McIlhenny et al. ____ 210—33X |
| 2,815,322 | 12/1957 | Higgins _____ 210—33 |
| 3,056,743 | 10/1962 | Eichorn et al. _____ 210—33 |
| 3,152,072 | 10/1964 | Yomiyama et al. ____ 210—189X |
| 3,298,791 | 1/1967 | Meyer et al. _____ 210—189X |
| 3,325,011 | 6/1967 | Keller _____ 210—189X |

FOREIGN PATENTS

| | | |
|---|---|---|
| 206,290 | 2/1957 | Australia _____ 210—33 |
| 778,859 | 7/1957 | Great Britain _____ 210—33 |

REUBEN FRIEDMAN, Primary Examiner

C. M. DITLOW, Assistant Examiner

U.S. Cl. X.R.

210—33